STYLUS BRUSH CLEANER

Filed April 29, 1963

Inventors:
Ernest O.P. Tatter
Martin C. Reed
William R. Baillie
By: Hofgren, Wegner, Allen, Stellman & McCord
Attorneys

STYLUS BRUSH CLEANER

Filed April 29, 1963 2 Sheets-Sheet 2

United States Patent Office 3,212,784

Patented Oct. 19, 1965

3,212,784

STYLUS BRUSH CLEANER

Ernest O. P. Tatter, Addison, and Martin C. Reed and William R. Baillie, Roselle, Ill., assignors to Warwick Electronics Inc., a corporation of Delaware Filed Apr. 29, 1963, Ser. No. 276,629

10 Claims. (Cl. 274—1)

This invention relates in general to automatic record changing apparatus, and more particularly to a brush assembly which is adapted to clean the stylus carried by the tone arm of an automatic record changer.

One of the major problems confronting those concerned with the development of the record changer art had been the tendency for dust, lint, and other foreign particles to accumulate upon the stylus while tracking a record. Such an accumulation materially reduces the quality of the sound reproduced, and hastens the deterioration of the record and the stylus itself. Accordingly, the general purpose of the present invention is to provide a brush which will periodically contact the stylus and remove substantially all of the foreign particles which are contained thereon.

In a majority of commercially available automatic record changers, a mechanism is employed which swings the tone arm to one side of the turntable after each record is played to either a rest position, if no further records are to be played, or to a pause position to allow the next record to fall upon the turntable, if additional records are to be played. A more specific object of the invention is therefore to place a brush device adjacent a turntable in the path of travel of the stylus so that the stylus will contact the brush every time the tone arm swings to one side of the turntable and again when the tone arm swings toward the center of the turntable.

A further object of the invention is to associate hold-down means with the brush assembly to provide means for securing the tone arm in the rest position.

A still further object of the invention is to provide a stylus brush assembly with means for automatically positioning the brush in a stylus contacting position.

Yet another object of the invention is to provide a stylus brush assembly wherein the brush is moved out of contact with the stylus when the tone arm is lowered into the rest position and toward the brush to prevent undue deformation of the brush.

Still another object of the invention is to provide a stylus brush cleaner which is simple in construction, efficient in operation, well adapted for its intended purposes, and relatively inexpensive to manufacture and maintain.

These and other objects of the invention will become more fully apparent from the following specification and drawings wherein.

Figure 1:
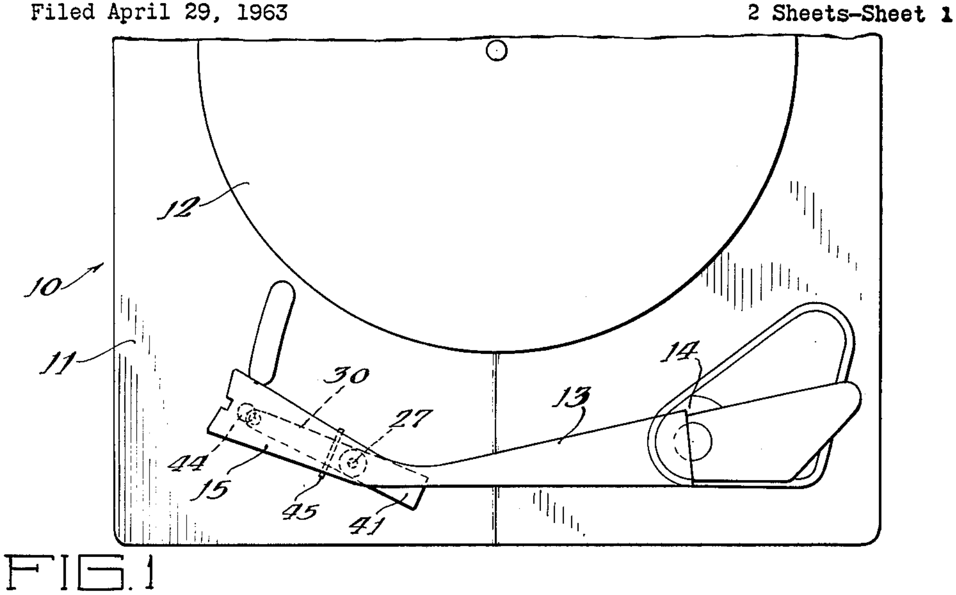
FIGURE 1 is a fragmentary plan view of an automatic record changer employing one embodiment of the present invention.
Figures 5, 6, 7, 8:
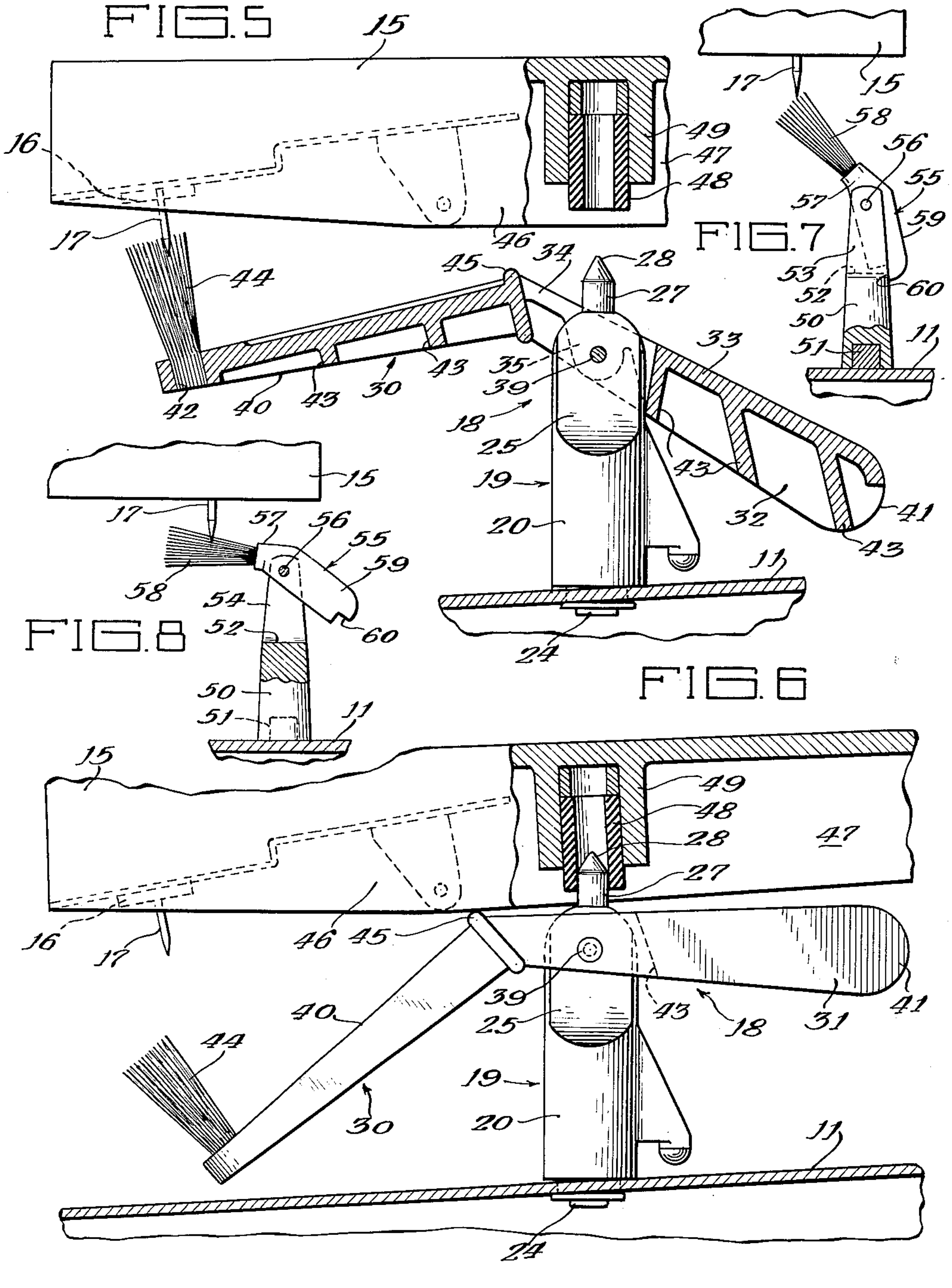
FIGURE 5 is a side elevational view, partly in section, of one embodiment of the stylus brush assembly in the brushing position.
FIGURE 6 is a view similar to FIGURE 5, but showing the tone arm in the rest position.
FIGURE 7 is a side elevational view, partly in section, of a second embodiment of the stylus brush assembly in the brushing position.
FIGURE 8 is a view similar to FIGURE 7 showing the tone arm in the rest position.

Referring now to the drawings, wherein like reference characters designate like or corresponding parts throughout the several views, reference numeral 10 is used in FIGURE 1 to indicate the automatic record changer in its entirety. Record changer 10 includes a substantially rectangular motor board 11 having a turntable 12 rotatably mounted in the center thereof. A tone arm 13 is mounted upon a standard 14, which is provided upon motor board 11, for swinging movement toward and away from turntable 12, as is well known in the art. Tone arm 13 terminates in an enlarged head 15 having a cartridge 16 mounted therein, as is best seen in FIGURE 5 and FIGURE 6. Cartridge 16 is provided with a stylus 17, that is adapted to track the groove of a record not shown, that rotates with turntable 12. The tracking action of stylus 17 within the record groove will cause dust and other foreign particles present on the record surface to adhere to stylus 17. To remove these particles from stylus 17, a brush assembly, indicated generally at 18, is mounted on motor board 11 adjacent turntable 12.

Stylus brush assembly 18 includes a standard 19 having a cylindrical lower portion 20. The bottom surface of cylindrical section 20 is provided with a cylindrical extension 21 of reduced width, which defines pilot means that are adapted to seat standard 19 within an aperture or recess 22 provided in motor board 11. Standard 19 is provided with an internally threaded bore 23 that receives the threaded shank of screw 24, to removably secure standard 19 to the motor board 11. The upper portion of standard 19 is narrowed to define parallel faces or cheeks 25 and 26. Standard 19 further includes a vertically extending cylindrical pin-shaped extension 27 having a diameter equal to the distance between faces 25 and 26, and terminating in a point 28. An opening 29 extends transversely across standard 19 at substantially right angles to faces 26 and 27, the purpose of which will hereinafter become apparent.

Figures 2, 3, 4:
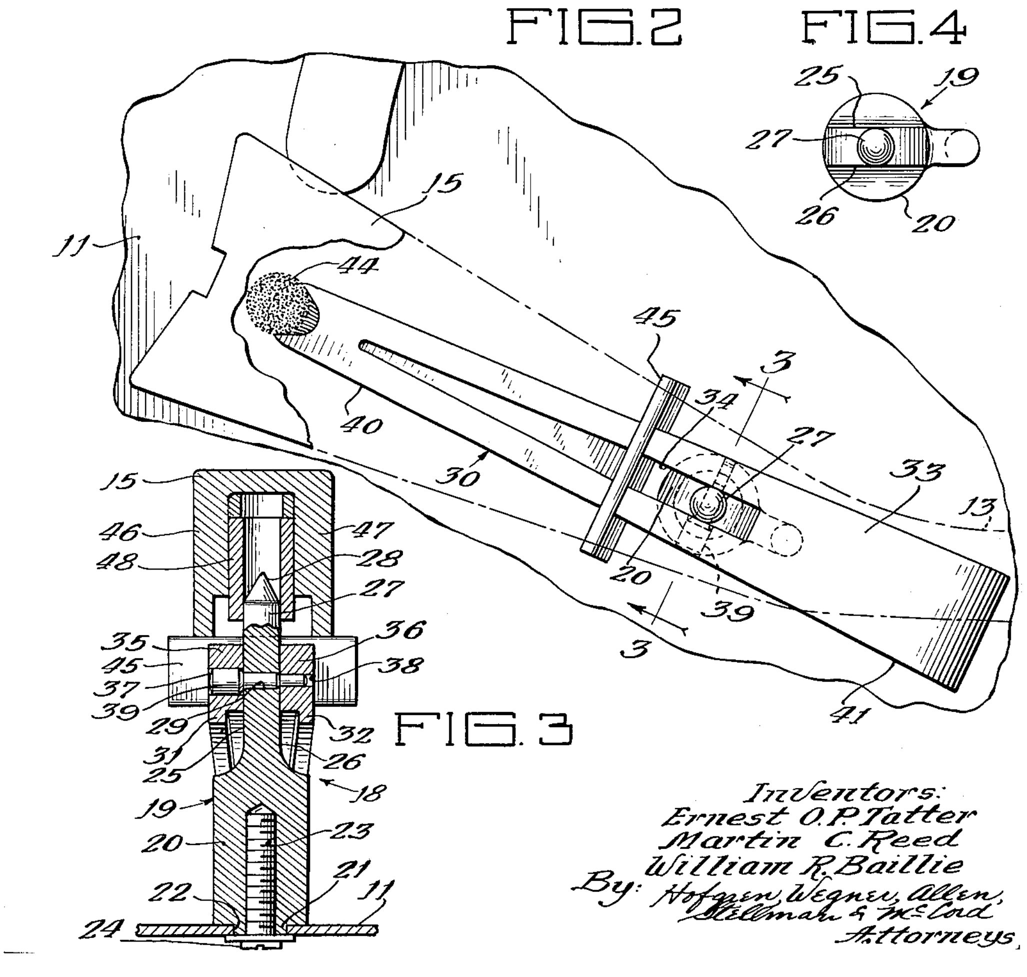
FIGURE 2 is a partial plan view of an enlarged scale of certain structure shown in FIGURE 1, with certain parts broken away for clarity.
FIGURE 3 is a sectional view taken along line 3—3 of FIGURE 2.
FIGURE 4 is a plan view of the standard of the stylus brush assembly.

Stylus brush assembly 18 further includes a rocker member 30 having spaced apart parallel depending sides or legs 31 and 32, spanned by a transverse top member 33. Member 33 is provided with an elongate opening 34 adjacent its central portion, which is adapted to receive faces 25 and 26 of standard 19. As is best seen in FIGURE 3 and in FIGURE 5, walls 31 and 32 are provided with enlarged apertured ear members 35 and 36 which are positioned in face abutting relation with faces 25 and 26. From FIGURE 3 it is apparent that the aperture 37 in side 31 is substantially larger than the aperture 29 extending between faces 25 and 26, and that the aperture 38 and side 32 is substantially smaller than aperture 29. A pin 39, having three sections of different diameter corresponding in size to the diameter of apertures 37, 29, and 38, impales sides 31 and 32 and standard 19 to provide a pivot means for rocker 30 about standard 19. It should be understood that the three sections on pin 39 are substantially concentric with one another to provide a pivot axis which is generally parallel with motor board 11. It should be apparent that the provision of different size apertures, and the provision of different size sections upon pin 39 greatly facilitate the alignment of the apertures during assembly.

Rocker 30 includes a first end portion 40 which extends in one direction from the pivot axis defined by pin 39, and a second end portion 41 which extends in an opposite direction from the pivot axis defined by pin 39. As is best seen in FIGURE 2, end 40 tapers in width to a narrow tip having a transverse aperture 42. Sides 31 and 32 diverge outwardly toward end 41 which is substantially wider than the narrowed tip of end 40. A plurality of supporting ribs 43 extend transversely across rocker 30 between sides 31 and 32. Ends 40 and 41 are tapered in height as well as in width, end 40 converging at its outermost portion, and end 41 diverging at its outermost portion. Thus it can be readily understood that end 41 is substantially heavier than end 40, and functions as a counterweight means to normally pivot rocker 30 about the axis of pin 39 into the stylus engaging position illustrated in FIGURE 5. The bottom edge of the supporting rib 43 adjacent opening 34 contacts standard 19, when rocker 40 is in the stylus engaging position, and acts as a stop means to orient the rocker 30 in the desired position. A brush 44 is removably mounted in aperture 42, and extends upwardly from rocker end 40 into the path of travel of stylus 17, when rocker 30 is in the position illustrated in FIGURE 5.

Rocker 30 is provided with abutment means in the form of a transversely extending rib 45 which projects upwardly from surface 33 and outwardly from the sides 31 and 32. Tone arm 13 has depending side portions 46 and 47 which, as the tone arm is lowered into the rest position, contact rib 45 and pivot rocker 30 about the axis of pin 39. Since brush 44 is positioned a greater distance from pivot member 39 than rib 45, the brush will move through a larger arc than the rib in response to a given angular movement of rocker 30, and thus brush 44 will swing into a position out of engagement with stylus 17, such as that shown in FIGURE 6. A gripping sleeve 48 formed of resilient material is held between suitable holding means 49 formed on the interior of tone arm walls 46 and 47. Stylus brush assembly 18 is mounted on motor board 11 in such a position that as tone arm 13 is lowered into the rest position, sleeve 48 will be in alignment with pin 27. Point 28 will facilitate entry of pin 27 into sleeve 48, and a slight amount of manual pressure upon tone arm 13 will force pin 27 into snug holding relation with respect to gripping sleeve 48.

When it is desired to play a record, tone arm 13 is lifted to free sleeve 48 from gripping engagement with pin 27 and the tone arm is lifted out of engagement with rocker 30 and swung over to the turntable to engage a record which has previously dropped upon the turntable. The movement of the tone arm away from the stylus brush assembly enables the weighted end 41 of rocker 30 to pivot the rocker around the pivot axis of pin 39 into the position shown in FIGURE 5. Every time tone arm 13 swings outwardly from turntable 12 to allow another record to be dropped, or toward the center of the turntable, this motion being known as the change cycle in the art, stylus 17 will engage brush 44, and any foreign particles which have accumulated upon stylus 17 will be displaced due to the cleaning action of brush 44. When the last record has been played, the linkage for moving tone arm 13 will lower it into the rest position illustrated in FIGURE 6.

A second embodiment of the stylus brush cleaner is shown in FIGURE 7 and FIGURE 8. This embodiment includes a standard 50 which is removably secured to motor board 11 by suitable fastening means 51, such as a magnet, bolt, or the like. The upper portion of standard 50 is provided with a central groove 52, which defines two spaced apart wings 53 and 54. A rocker 55 is positioned between wings 53 and 54 and is pivotally mounted with respect thereto by having a transverse pivot pin 56 extend through apertures suitably provided in wings 53 and 54, and in rocker 55. A first end portion 57 of rocker 55 extends on one side of pivot 56 and is provided with an aperture in which a brush 58 is removably mounted. A second end portion 59 of rocker 55 extends on an opposite side of pivot pin 56 from end 57, and is provided with a shoulder 60 which is adapted to engage standard 50 adjacent groove 52, when rocker 55 is in an upright stylus engaging position, such as shown in FIGURE 7. End 59 is substantially longer and heavier than end 57, and provides counterweight means for holding the rocker in an upright stylus engaging position. When tone arm 13 is lowered into a rest position, stylus 17 will contact brush 58 and pivot rocker 55 around pivot pin 56 into a position such as shown at FIGURE 8.

From the foregoing it should be apparent that what has been provided is a novel stylus brush assembly which fully achieves each of the objects of the invention in an expeditious manner. Obviously, modifications and variations may be resorted to by those skilled in the art without departing from the spirit and scope of the invention, as set forth in the appended claims, as only preferred embodiments of the invention have been disclosed.

We claim:

1. In an automatic record changer including a motor board, and a stylus carrying tone arm swingably mounted with respect to said motor board for movement thereabove back and forth from a rest position to a playing position, the combination with said record changer of a stylus brush assembly comprising: a stylus brush, means on said motor board supporting said brush above said motor board for elevational movement relative to the motor board into an operative positon in the path of travel of said stylus, means confining said brush to elevational movement, means yieldably urging the brush into operative position, and means on the tone arm for moving said brush out of the path of travel of said brush.

2. For use with an automatic record changer including a motor board, and a stylus carrying tone arm swingably mounted with respect to said motor board for movement back and forth from a rest position to a playing position, a stylus brush assembly comprising: a standard adapted to be mounted upon said motor board adjacent said tone arm rest position, pivot means on said standard, a rocker pivotally mounted on said pivot means for movement between an operative and an inoperative position, means confining the rocker for movement about said pivot means, a brush on said rocker positioned in the path of travel of said stylus when said rocker is in the operative position and out of the path of travel of said stylus when said rocker is in the inoperative position, said brush being adapted to contact said stylus when said tone arm is moved relative to said motor board, means for retaining said rocker in the operative position, said rocker having a portion engageable with said tone arm when said tone arm is lowered into the rest position to pivot said rocker on said pivot means into said inoperative position.

3. For use with an automatic record changer including a motor board, and a stylus carrying tone arm swingably mounted with respect to said motor board for movement back and forth from a rest position to a playing position, a stylus brush assembly comprising: a standard adapted to be mounted upon said motor board adjacent said tone arm rest position, pivot means on said standard, a rocker pivotally mounted on said pivot means for movement between an operative and an inoperative position, means confining the rocker for movement about said pivot means, a brush on said rocker positioned in the path of travel of said stylus when said rocker is in the operative position, said brush being adapted to contact said stylus when said tone arm is moved relative to said motor board, counterweight means for retaining said rocker in the operative position, said rocker having a portion engageable with said tone arm when said tone arm is lowered into the rest position to pivot said rocker on said pivot means into said inoperative position.

4. The stylus brush assembly of claim 3 wherein said rocker is provided with stop means engageable with said standard when said rocker is in the operative position to properly locate said brush in the path of travel of said stylus.

5. A stylus brush assembly of claim 4 wherein said standard is removably mounted on said motor board.

6. In a record changer having a motor board with a turntable and a stylus carrying tone arm movable relative to said turntable between a playing position and a position beyond the turntable during changing of a record, the combination with said record changer of a stylus cleaning mechanism comprising: a stylus brush, a support on said motor board and carrying said stylus brush, said support locating said brush above the motor board adjacent the record changing position of the tone arm, said support including means mounting said brush for elevational movement relative to the motor board between a depressed position out of the path of travel of said stylus and an elevated operative position in the path of travel of said stylus, means confining said brush to elevational movement, means yieldably urging the brush to operative position, and means on the tone arm engageable with the support to move the brush to said depressed position.

7. For use with an automatic record changer including a motor board, and a stylus carrying tone arm swingably mounted with respect to said motor board for movement back and forth from a rest position to a playing position, a stylus brush assembly comprising: a standard adapted to be mounted upon said motor board adjacent said tone arm rest position, pivot means on said standard, a rocker pivotally mounted on said pivot means for movement between an operative and an inoperative position, a brush on said rocker positioned in the path of travel of said stylus when said rocker is in the operative position, said brush being adapted to contact said stylus when said tone arm is moved relative to said motor board, counterweight means for retaining said rocker in the operative position, said rocker having a portion engageable with said tone arm when said tone arm is lowered into the rest position to pivot said rocker on said pivot means into said inoperative position, and hold-down means on said standard engageable with said tone arm for retaining said tone arm in rest position.

8. The stylus brush assembly of claim 7 wherein said tone arm includes a sleeve of resilient material mounted thereon, and said hold-down means includes a vertical pin-like extension of said standard adapted to frictionally engage said sleeve when said tone arm is in the rest position.

9. In an automatic record changer including a motor board, and a stylus carrying tone arm swingably mounted with respect to said motor board for movement back and forth from a rest position the combination with said record changer of to a playing position, a stylus brush assembly comprising: a standard, fastening means removably securing said standard to said motor board, an opening in said standard, a rocker having spaced apart apertured legs positioned on opposed sides of and embracing said standard, a pivot pin impaling said rocker leg apertures and said standard opening to pivotally mount said rocker on said standard, said rocker having spaced apart end portions extending on opposite sides of said pivot pin, a brush affixed to one end portion of said rocker and adapted to contact said stylus when said tone arm is moved relative to said motor board, counterweight means on the other end of said rocker adapted to pivot said rocker about said pivot pin and position said brush in the path of travel of said stylus, and abutment means on said rocker engageable with said tone arm when said tone arm is lowered into the rest position to pivot said rocker about said pivot pin.

10. In an automatic record changer including a motor board having a recess, and a stylus carrying tone arm swingably mounted with respect to said motor board for movement back and forth from a rest position to a playing position, a stylus brush assembly comprising: the combination with said record changer at a standard, pilot means on said standard seating said standard in said recess, fastening means removably securing said standard in said recess, an opening in said standard, a rocker having spaced apart apertured legs positioned on opposed sides of and embracing said standard, a pivot pin impaling said rocker leg apertures and said standard opening to pivotally mount said rocker on said standard, said rocker having spaced apart end portions extending on opposite sides of said pivot pin, a brush affixed to one end portion of said rocker and adapted to contact said stylus when said tone arm is moved relative to said motor board, counterweight means on the other end of said rocker adapted to pivot said rocker about said pivot pin and position said brush in the path of travel of said stylus, and abutment means on said rocker engageable with said tone arm when said tone arm is lowered into the rest position to pivot said rocker about said pivot pin.

References Cited by the Examiner

UNITED STATES PATENTS 2,955,825 10/60 Staar ---------------- 274—47 X
3,162,445 12/64 Henry ---------------- 274—47

FOREIGN PATENTS 98,206 6/62 Great Britain.

NORTON ANSHER, *Primary Examiner.*

EVON C. BLUNK, *Examiner.*